W. KNIGHT.
Velocipede.

No. 159,584 — Patented Feb. 9, 1875.

WITNESSES:
Gustave Datinok
A. F. Terry

INVENTOR:
W. Knight
BY
Munn & Co.
ATTORNEYS.

THE GRAPHIC CO. PHOTO-LITH. 39 & 41 PARK PLACE, N.Y.

UNITED STATES PATENT OFFICE.

WALTER KNIGHT, OF SAN ANDREAS, CALIFORNIA.

IMPROVEMENT IN VELOCIPEDES.

Specification forming part of Letters Patent No. 159,584, dated February 9, 1875; application filed October 17, 1874.

*To all whom it may concern:*

Figure 1:
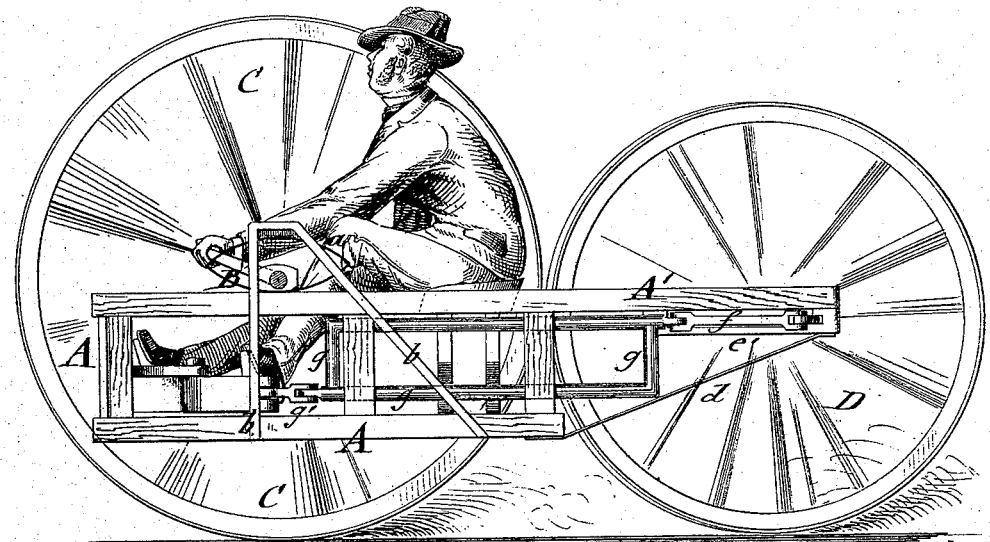
Figure 2:
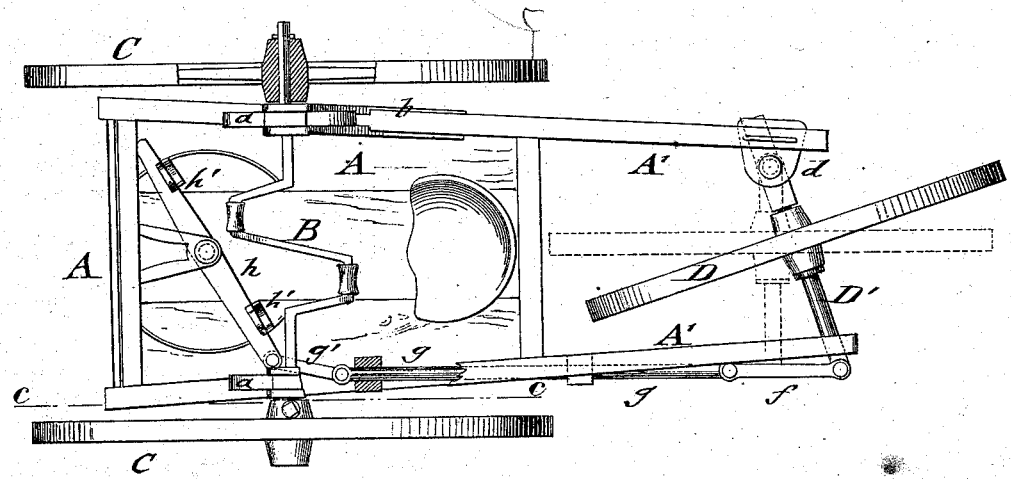

Be it known that I, WALTER KNIGHT, of San Andreas, in the county of Calaveras and State of California, have invented a new and Improved Perambulator, of which the following is a specification:

In the accompanying drawing, Figure 1 represents a side elevation, and Fig. 2 a top view, of my improved perambulator.

Similar letters of reference indicate corresponding parts.

The invention will first be fully described, and then pointed out in the claim.

In the drawing, A represents the box-frame or carriage-body of my perambulator, which is hung by means of cushioning-springs $a$ and supporting-braces $b$ to the double crank-axle B of the front or driving wheels C. One of the front wheels, C, is keyed fast to the axle B, while the other revolves loosely thereon, for the purpose of assisting in the guiding of the carriage. The body A is tapering toward the rear, and provided there with a spring-seat for the occupant, who applies the hands to the double crank of the axle for revolving the same, and propelling thereby the carriage. The side pieces A' of the box-frame or body are extended to suitable distance back of the same, and braced by rods $d$ for the purpose of supporting the rear steering-wheel D, which is of smaller diameter than the front wheels C. The axle D' of the steering-wheel D is fulcrumed to sleeve-shaped bearings $e$ at the inner side of side piece A', sliding with its outer end steadily therein, while the opposite end of the axle slides in a slotted guide-part, $e'$, of the other side piece, A', being pivoted by an intermediate link, $f$, to the longitudinally-sliding rod $g$, which is guided in the side frame of body A, and connected by a pivoted front, $g'$, with the end of a swinging lever, $h$, that is centrally fulcrumed to the front part of the bottom of body A, and provided with foot-supports $h'$, equidistant from the center. The feet rest on these supports during the revolving of the front crank-axle by the hands, and turn the lever $h$ and therewith turn the rear wheel to either side for guiding and steering the perambulator.

The steady hold which is exercised by the simultaneous action of the feet on the fulcrumed lever keeps the steering-wheel in any desired position, so that the carriage may be easily guided in the required direction, while the size of the front wheels and lightness of the whole structure admit the ready and quick forward propulsion on good roads.

Having thus described my invention, what I calim as new, and desire to secure by Letters Patent, is—

The combination of foot-lever $h$ $h'$, links $f$ and $g'$, sliding rod $g$, pivoted and guided axle D', and rear steering-wheel D, substantially as set forth.

WALTER KNIGHT.

Witnesses:
GEORGE CUTTER,
CHARLES VICTOR GOTTSCHALK.